United States Patent [19]
Chiarot et al.

[11] Patent Number: 5,319,761
[45] Date of Patent: Jun. 7, 1994

[54] DIRECTORY LOOK-ASIDE TABLE FOR A VIRTUAL STORAGE SYSTEM INCLUDING MEANS FOR MINIMIZING SYNONYM ENTRIES

[75] Inventors: Kevin A. Chiarot, Poughkeepsie; Richard J. Schmalz, Wappinger Falls; Theodore J. Schmitt, Kingston; Arnold S. Tran, Shokan; Shih-Hsiung S. Tung, Kingston, all of N.Y.

[73] Assignee: International Business Machines Corporation, Armonk, N.Y.

[21] Appl. No.: 744,203

[22] Filed: Aug. 12, 1991

[51] Int. Cl.[5] ............................................. G06F 13/00
[52] U.S. Cl. .................................................. 395/400
[58] Field of Search .............................. 395/400, 425; 364/200 MS File, 900 MS File

[56] References Cited

U.S. PATENT DOCUMENTS

| | | | |
|---|---|---|---|
| 4,096,573 | 6/1978 | Heller et al. | 364/200 |
| 4,136,385 | 1/1979 | Gannon et al. | 364/200 |
| 4,727,482 | 2/1988 | Roshon-Larsen et al. | 364/200 |
| 4,736,287 | 4/1988 | Druke et al. | 364/200 |
| 4,774,659 | 9/1988 | Smith et al. | 395/400 |
| 5,134,696 | 7/1992 | Brown et al. | 364/DIG. 1 |
| 5,157,777 | 10/1992 | Lai et al. | 395/425 |

*Primary Examiner*—David L. Robertson

[57] ABSTRACT

An improved DLAT structure distinguishes between address spaces and data spaces. The DLAT structure classifies data spaces by one or more space identifications which control assignment of virtual page addresses to DLAT rows. In one embodiment, a "private space bit" is used to select different DLAT addressing algorithms. In another embodiment, data spaces are sub-classified using space identification bits, and for each sub-class, a unique algorithm is selected based on the page address bits. An Exclusive OR function is used to generate the DLAT selection bits. This approach minimizes private space synonyms while maximizing common space synonyms. The result is improved performance since the former minimizes thrashing and the latter maximizes the value of the DLAT common bit.

9 Claims, 4 Drawing Sheets

| STO | X | SEGMENT TABLE ORIGIN | | P | | SEGMENT TABLE LENGTH |
|---|---|---|---|---|---|---|
| | 0 | 1                19 | 20 | 23 | | 25              31 |

FIG.3

SPACE-ID BITS | SEGMENT TABLE ORIGIN (STO) |
1                                              19

FIG.4

| (STO) SPACE-ID BITS SUB-CLASSES | PAGE-ADDR HIGH ORDER BITS | |
|---|---|---|
| | 0 | 1 |
| 0 | 0 | 1 |
| 1 | 1 | 0 |

EFFECTIVE DLAT ROW SELECT HIGH ORDER BIT

FIG.5

| (STO) SPACE-ID BITS SUB-CLASSES | PAGE-ADDR HIGH ORDER BITS | | | |
|---|---|---|---|---|
| | 00 | 01 | 10 | 11 |
| 00 | 00 | 01 | 10 | 11 |
| 01 | 01 | 00 | 11 | 10 |
| 10 | 10 | 11 | 00 | 01 |
| 11 | 11 | 10 | 01 | 00 |

EFFECTIVE DLAT ROW SELECT HIGH ORDER BITS

FIG.7

| (STO) SPACE-ID BITS SUB-CLASSES | PAGE-ADDR HIGH ORDER BITS | | | | | | | |
|---|---|---|---|---|---|---|---|---|
| | 000 | 001 | 010 | 011 | 100 | 101 | 110 | 111 |
| 000 | 000 | 001 | 010 | 011 | 100 | 101 | 110 | 111 |
| 001 | 001 | 000 | 011 | 010 | 101 | 100 | 111 | 110 |
| 010 | 010 | 011 | 000 | 001 | 110 | 111 | 100 | 101 |
| 011 | 011 | 010 | 001 | 000 | 111 | 110 | 101 | 100 |
| 100 | 100 | 101 | 110 | 111 | 000 | 001 | 010 | 011 |
| 101 | 101 | 100 | 111 | 110 | 001 | 000 | 011 | 010 |
| 110 | 110 | 111 | 100 | 101 | 010 | 011 | 000 | 001 |
| 111 | 111 | 110 | 101 | 100 | 011 | 010 | 001 | 000 |

FIG.8

DIRECTORY LOOK-ASIDE TABLE FOR A VIRTUAL STORAGE SYSTEM INCLUDING MEANS FOR MINIMIZING SYNONYM ENTRIES

BACKGROUND OF THE INVENTION

1. Field of the Invention

The present invention generally relates to virtual storage mechanisms for data processing systems and, more particularly, to an improved directory look-aside table (DLAT) structure which is capable of improved handling of the periodicity of virtual page addresses when processing among multiple data spaces. The invention is specifically directed to the minimization of synonym entries in the DLAT for a system having DLAT entries that can concurrently translate virtual addresses in multiple data spaces into real main storage addresses.

2. Description of the Prior Art

Virtual storage organization and management for data processing systems are described, for example, by Harvey M. Deitel in *An Introduction to Operating Systems*, Addison-Wesley (1984), by Harold Lorin and Harvey M. Deitel in *Operating Systems*, Addison-Wesley (1981), and by Harold S. Stone in *High-Performance Computer Architecture*, Addison-Wesley (1987). In a virtual storage system, paging is a relocation and address-to-physical-location binding mechanism providing the user of the system with what appear to be considerably larger memory spaces than are really available. The key feature of the virtual storage concept is disassociating the addresses referenced in a running process from the addresses available in main storage. The addresses referenced by the running process are called virtual addresses, while the addresses available in main storage are called real addresses. The virtual addresses must be mapped into real addresses as the process executes, and that is the function of the dynamic address translation (DAT) mechanism. One such mechanism employs a directory look-aside table (DLAT), sometimes referred to as a translation look-aside buffer (TLB), which stores recent virtual address translations. For virtual addresses stored in the DLAT, the translation process requires only a single or, at most, a couple of machine cycles. For addresses not stored in the DLAT, the DAT process may take from fifteen to sixty cycles.

Translations from the virtual address to the real address must be made to find where the addressed instruction or data is in main storage. This is typically done on a page basis. In fact, the translations stored in the DLAT are actually only page translations, and the last bits of an address are the location in that page, so only the page address must be translated.

In conventional virtual storage systems, a condition called thrashing can occur wherein the system can do little useful work because of excessive paging. The condition was recognized and discussed, for example, by P. J. Denning in "Thrashing: its Causes and Prevention", *AFIPS Conf. Proc.*, vol. 33, 1968 FJCC, pp. 915-922. Denning maintained that for a program to run efficiently, its working set of pages must be maintained in primary storage; otherwise, thrashing would occur as the program repeatedly requests pages from secondary storage. The condition is mentioned in Deitel, supra, in section 9.5, "Working Sets" in his chapter on Virtual Storage Management.

U.S. Pat. No. 4,136,385 to Gannon et al. addresses the problem with a synonym control for multiple virtual storage systems. The Gannon et al. DLAT synonym control controls the setting of an indicator in each DLAT entry for indicating whether the DLAT entry is to be shared by all user address spaces or is to be restricted to a single address space identified in the DLAT. This is accomplished by means of a common space bit in any segment table entry (STE) or, alternatively, in any page table entry (PTE) in any private address space to indicate whether the segment or page contains programs and data private to the address space or shared by all address spaces. Thus, each DLAT entry contains a common/private storage indicator which is set to the state of the common space bit in the STE or PTE used in an address translation loaded into the DLAT entry. When the entry is read, the private/common storage indicator controls whether the DLAT can only be used by the address space identified in the DLAT or by all address spaces.

Conventional two-way DLAT designs inadequately handle the periodicity of virtual page addresses when processing among multiple data spaces. A typical two-way DLAT design maps identical virtual addresses in all data spaces to the same DLAT row. For example, in the following pseudocode $$DO\ i=1\ to\ 1,000$$

$$A(i)+B(i)=C(i),$$

if A, B and C have the same origin (e.g., zero) in each of three data spaces, the code will deliver poor performance due to DLAT thrashing caused by data space synonyms. While the Gannon et al. synonym control eliminates a class of synonym entries by means of a common space bit, it does not address the class of synonym problems in a two-way DLAT produced by three data spaces having the same origin.

SUMMARY OF THE INVENTION

It is therefore a general object of the present invention to provide an improved DLAT logic which distinguishes between address spaces and data spaces to effectively handle the periodicity of virtual page addresses when processing among multiple data spaces. Data spaces are spaces reserved for private data for a predetermined number (e.g., one) of address spaces, as opposed to address spaces which have access to common programs, data or the like. Data spaces are also known as "private spaces". Address spaces, on the other hand, are represented in the system by a segment table, which is defined to the processor by a segment table origin (STO) (discussed in further detail below). Each STO is a real address for locating the beginning of a segment table.

It is another, more specific object of the invention to provide an improved DLAT logic which classifies data spaces by one or more space identifications which control assignment of virtual page addresses to DLAT rows.

According to the invention, there is provided an improved DLAT logic which uses a "private space bit", corresponding to the common space bit of the Gannon et al. synonym control, to select different DLAT addressing algorithms. Data spaces are further sub-classified using space identification bits, and for each sub-class, a unique algorithm is selected based on the page address bits. Thus, the invention provides a mechanism for classification of the data spaces (e.g., the privates spaces not commonly accessible to all address spaces). As an example, the mechanism for classifying the data spaces may be space identification bits. For each subclass, a unique algorithm (discussed in further detail below) is selected based on the page address bits of the virtual address. An Exclusive OR function is used to generate the DLAT selection bits.

This approach minimizes private space synonyms while maximizing common space synonyms. The result is improved performance since the former minimizes thrashing and the latter maximizes the value of the DLAT common bit.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a block diagram illustrating the format of the Segment Table Designation (STD) showing the private-space bit;

FIG. 4 is a fragment of FIG. 3 showing the Segment Table Origin (STO) bits used as SPACE-ID bits;

FIG. 5 is a table showing the Exclusive OR operation using the STD bit to define two subclasses;

FIG. 7 is a table showing the Exclusive OR operation using two space identification bits to define four subclasses; and FIG. 8 is a table showing the Exclusive OR operation using three space identification bits to define eight subclasses.

DETAILED DESCRIPTION OF A PREFERRED EMBODIMENT OF THE INVENTION

Figure 1:
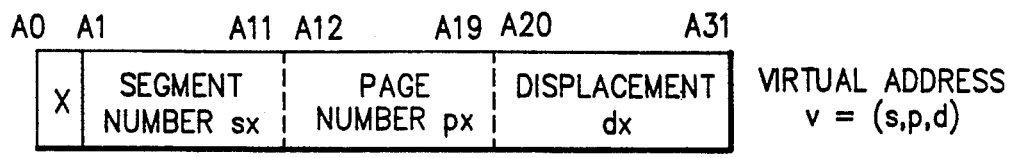
FIG. 1 is a block diagram illustrating the format of a virtual address.

The description which follows uses the term "DLAT" for dynamic look-aside table, but those skilled in the art will understand that this term may be used interchangeably with "TLB" for translation look-aside buffer. For purposes of the following description, a paging/segmentation virtual address system is assumed. In such systems, the virtual address format is as shown in FIG. 1 and comprises s-bits for the segment index (SX), p-bits for the page index (PX), and d-bits for the displacement index (DX). The virtual address may be, for example, 31 bits of which bits A1 through A11 comprise the segment bits, bits A12 through A19 comprise the page bits, and bits A20 through A31 comprise the displacement bits.

Figure 2:
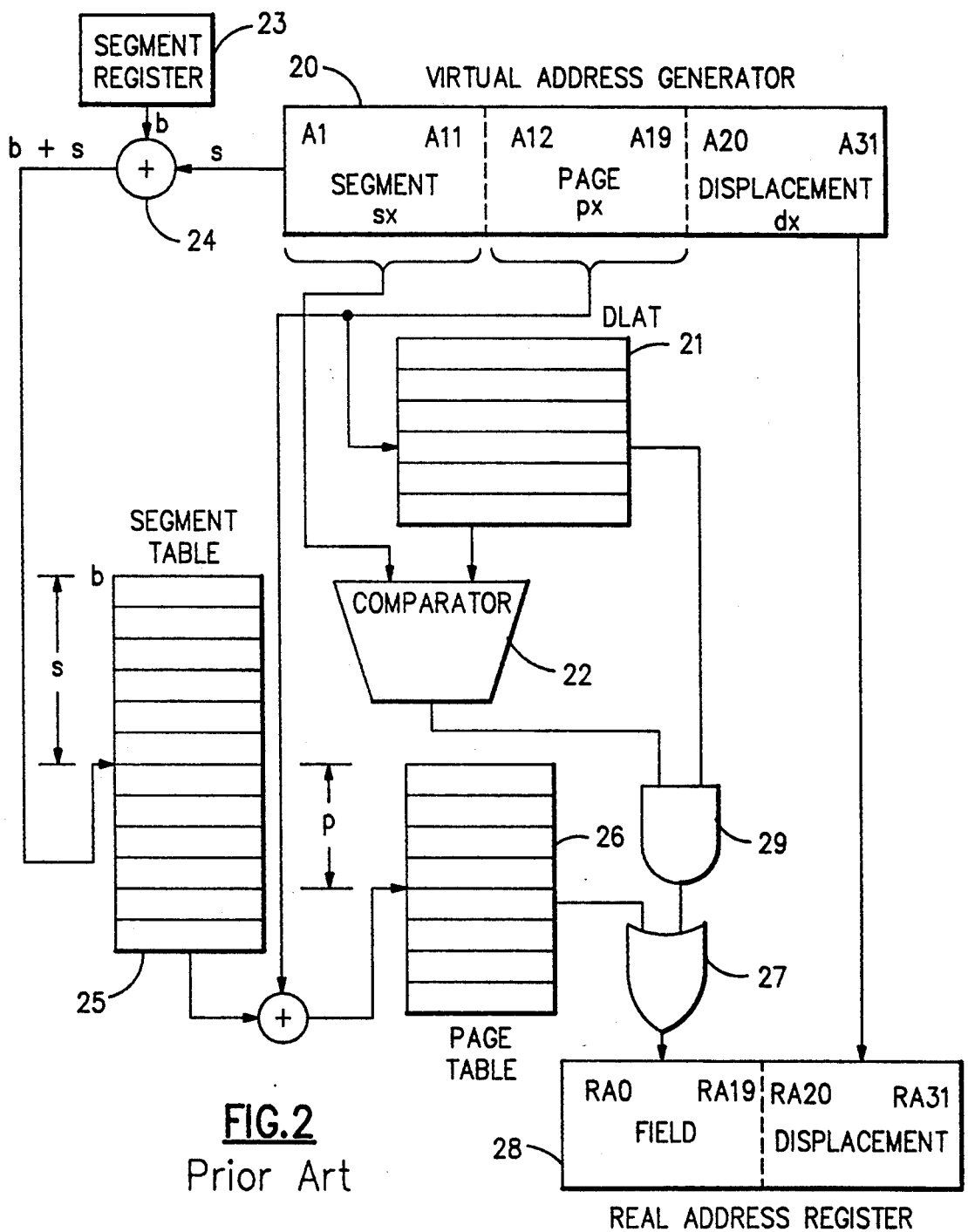
FIG. 2 is a block diagram of a conventional dynamic address translation structure.

As shown in FIG. 2, the virtual address is generated by address generator 20. The address generator 20 is part of a central processing unit (CPU) (not shown). The most recently referenced pages have entries in the DLAT 21. For a DLAT with 256 congruence classes, bits A12 through A19 of the virtual address are used to address the DLAT. The virtual page identification bits from the addressed entry read out of the DLAT 21 are compared in comparator 22 with bits A1 through A11 of the virtual address. If there is no match, a DLAT miss has occurred. On a DLAT miss, address translation is obtained through, for example, a segment/page table search and placed in the DLAT. The structure which performs this search is referred to as the buffer control element (BCE).

The segment/page table search begins by adding the value in the segment table origin register 23 and the bits A1 to A11 of the virtual address in adder 24 to obtain an index value for the segment map table 25. The entry output from the segment map table 25 is, in turn, used as an index for the page map table 26 entry, there being a separate page map table for each segment. The entry output from the page map table 26 provides the page frame at which the virtual page resides in real storage and is passed by OR gates 27 and concatenated with the displacement bits A20 through A31 of the virtual address generator 20 to form the real address in real address register 28.

On the other hand, if there is a match in the DLAT 21, the comparator 22 enables AND gates 29 which passes the entry output from the DLAT 21 to OR gates 27. In this case, the entry output from the DLAT 21 is the associated real address field which is concatenated to the displacement bits A20 through A31 to form the real storage address in register 28. Obviously, this process of address translation is considerably faster than that of the segment/page table search which occurs on a DLAT miss. The segment/page table search may take fifteen to eighty cycles to complete, whereas a DLAT access can be completed in one cycle.

Normally, most address translation requests are made by a search of the DLAT, and while the segment/page table search takes a greater number of processor cycles than making the translation by means of the DLAT, the segment/page table search is itself not without the possibility of a translation failure. For example, the segment map table search may indicate that the segment is not in primary or main storage, causing the operating system to locate the segment on secondary storage, i.e., a direct access storage device (DASD), create a page table for the segment, and load the appropriate page into primary storage, possibly replacing an existing page in the process.

Even if the segment is in primary storage, the desired page may not be in primary storage, causing the operating system to locate the page on secondary storage and loading the page in primary storage, again possibly replacing an existing page in the process. The process of accessing secondary storage can take up to several hundred processor cycles.

The foregoing description is for a conventional DLAT structure. A problem with this conventional DLAT structure is that it does not handle the problem of synonym entries in the DLAT in data processing systems which can simultaneously translate virtual addresses for multiple address spaces into real main storage addresses wherein different address spaces must have access to the same set of shared programs and data. Hence, in systems supporting multiple address spaces, different address spaces must be able to access the same set of common (e.g., shared within the context of the processing system) programs (e.g., system programs) and data (e.g., stored in primary storage). Thus, the services of operating system programs are needed by all programs in all address spaces. The address spaces are locations for storing an address information. That problem was addressed by Gannon et al., supra, who provided special controls employing a common space bit. This, however, does not address the problem caused by the periodicity of virtual page addresses when processing among multiple data spaces. That is, for the periodic processing example of $$A(i)+B(i)=C(i),$$

where A, B and C have the same virtual page addresses (e.g., zero) but with different data spaces, with a conventional two-way (X/Y sides) DLAT structure, the associated real addresses for A(i) and B(i) will be loaded into the X and Y sides of the DLAT respectively at address zero after address translation is completed. The associated real address for C(i) will be loaded into the X side of the DLAT at the same address zero after address translation, and that will overwrite the DLAT entry for A(i). For the next loop, A(i) will miss the DLAT compare and take many cycles to be retranslated. Then the associated real address will be loaded into the Y side of the DLAT, and that will overwrite the DLAT entry for B(i). This kind of DLAT thrashing will cause dramatic system performance degradation. The above example is designed to address the problem caused by the periodicity of virtual page addresses when processing among multiple data spaces. The periodic processing example of $A(i)+B(i)=C(i)$ is described in which A, B and C have the same virtual page addresses (e.g., zero or origin) but with different data spaces. Further, it is clear that with a conventional two-way (X/Y sides) DLAT structure, the associated real addresses for A(i) and B(i) will be loaded into the X and Y sides of the DLAT respectively at address zero (e.g., origin) after address translation is completed, with the problem of data thrashing resulting. As explained below, the invention is directed to reducing or eliminating thrashing of a DLAT.

Further, the loading of A(i) and B(i) at address zero, is simply exemplary and indicates the example in which A, B and C have the same virtual page addresses but different data spaces and leads to an example of data thrashing by the DLAT. This has been a problem of the conventional systems and while U.S. Pat. No. 4,136,385 to Gannon et al. (discussed above) attempts to overcome this problem by adding a common space bit, this technique has drawbacks as discussed above. Such drawbacks are avoided by the structure and method of the present invention in which address and data spaces are distinguished and in which data spaces are sub-classified by one or more space identification (SPACE-ID) discriminating low-order bits. For each sub-class of data spaces, virtual page address (PAGE-ADDR) bits are used to select a unique algorithm for the assignment of virtual page addresses to the DLAT rows.

The subject invention distinguishes between address spaces and data spaces. This kind of identification mechanism is known, as taught by Gannon et al., supra. Bit "23" of the Segment Table Designation (STD) is defined as a private-space (data-space) bit. FIG. 3 shows the STD-bit "23" labeled with the letter "p". This STD-bit, when a logical "1", is used to obtain the separation of data spaces in a DLAT. The STD-bit "23", when a logical "0", is used to retain the DLAT performance value of the common-segment bit for address spaces.

The invention builds on this mechanism by subclassifying data spaces by one or more space identification (SPACE-ID) discriminating (e.g., non-constant or random) low-order bits. FIG. 4 shows the Segment Table Origin (STO) bits "1" to "19" as SPACE-ID bits. In IBM's MVS system, these bits are stored in the STO register and may be unhashed non-constant, low-order bits or the low-order output bits of a hash of many STO non-constant bits. For each sub-class of data spaces, virtual page address (PAGE-ADDR) bits are used to select a unique algorithm for the assignment of virtual page addresses to the DLAT rows. These bits may be unhashed PAGE-ADDR bits or output bits of a hash of many PAGE-ADDR bits. The MVS environment refers to IBM Corporation's Multiple Virtual Storage (MVS) operating system introduced in mid-1974 for their line of main frame computers. For a general discussion of this operating system, see for example Chapter 21 of Deitel, supra.

In an exemplary embodiment, a two (even or odd) data-space sub-class design is realized by an Exclusive OR of a data space unhashed STO bit, such as bit "17" in an MVS environment, and the virtual page unhashed PAGE-ADDR high-order bit. The consequences of this design are as follows. For even sub-class data spaces (STO bit "17"=0), data space page addresses with a 0-value PAGE-ADDR high-order bit are assigned to even rows of the DLAT, and data space page addresses with a 1-value PAGE-ADDR high-order bit are assigned to odd rows of the DLAT. For odd sub-class data spaces (STO bit "17"=1), data space page addresses with a 0-value PAGE-ADDR high-order bit are assigned to odd rows of the DLAT, and data space page addresses with a 1-value PAGE-ADDR high-order bit are assigned to even rows of the DLAT.

Given a 256×2 DLAT, if the spaces A and C are in sub-class zero and the space B is in the sub-class one, then each corresponding even page of A is assigned to a DLAT even row, each corresponding even page of B is assigned to a DLAT odd row, and each corresponding even page of C is assigned to a DLAT even row. In like manner, each corresponding odd page of A is assigned to a DLAT odd row, each corresponding odd page of B is assigned to a DLAT even row, and each corresponding odd page of C is assigned to a DLAT odd row.

FIG. 5 shows a tabular representation of the Exclusive OR operation and illustrates the foregoing relation. Note that in FIG. 5 the zero sub-class data space assignment rule is the same as the assignment rule for address spaces. The zero sub-class data space (e.g., illustrated in detail in FIG. 5) assignment rule is the same as the assignment rule for address spaces described above. The "assignment rule" is simply how the address spaces (and data spaces) are assigned to rows of the DLAT. For the periodic processing example of $A(i)+B(i)=C(i)$, if at least one of the three data spaces is in a different sub-class than the other two data spaces as determined by STO low-order bits, there will be little or no thrashing of a two-way DLAT. This separation of data spaces is due to the fact that MVS assignment of STO bits to data spaces is usually random. In fact the probability of all three spaces referenced being in the same sub-class is 0.25. Moreover, when STO bits are assigned in sequence by MVS, the probability of all three consecutively created data spaces being in the same sub-class is zero.

Figure 6:
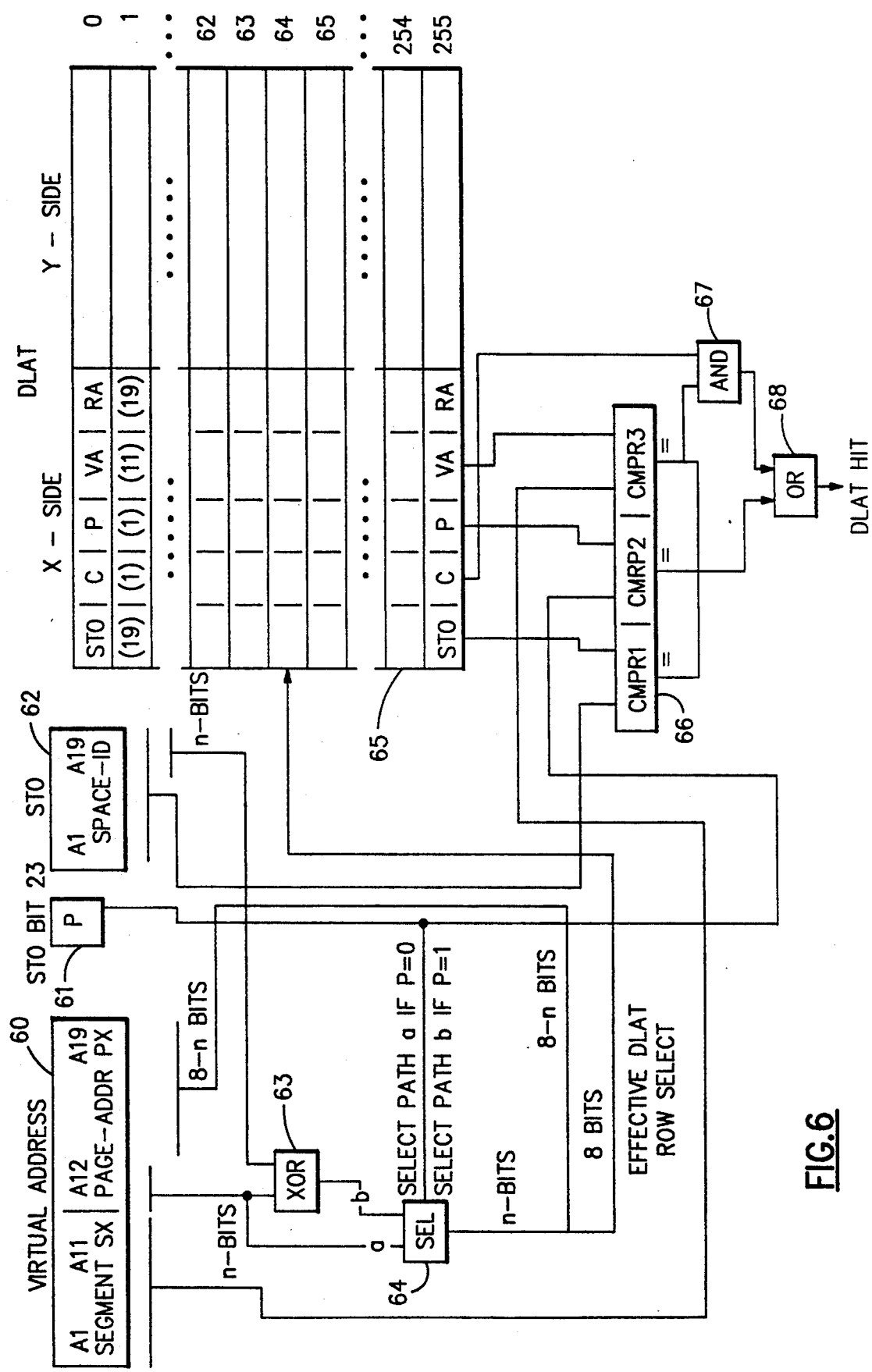
FIG. 6 is a block diagram showing the hardware implementing the Exclusive OR operation shown in FIG. 5.

The logic for DLAT handling according to a preferred embodiment of the invention is shown in FIG. 6, to which reference is now made. The logic receives as inputs bits from the virtual address 60, the STD bit "23", denoted by reference numeral 61, and SPACE-ID bits from the Segment Table Origin (STO) bits 62. Exclusive OR gate 63 receives n bits of the PAGE-ADDR of the virtual address 60 and n bits from the SPACE-ID 62. The n-bits of PAGE-ADDR are supplied as input a to the selector 64, while the output of Exclusive OR gate 63 are supplied as input b to selector 64. The operation of the selector 64 is controlled by the "p" bit 61.

The general case of n data-space sub-classes is obtained by generating a unique set of n bits for each combination of n discriminating low-order SPACE-ID bits and n high-order virtual page address (PAGE-ADDR) bits. The significance and origin of the Segment Table Origin (STO) bits or SPACE-ID bits and the STO register are discussed briefly above. The STO/SPACE-ID bits are for sub-classifying data spaces (with one or more SPACE-ID discriminating low-order bits). Such classification is made for avoiding thrashing of the DLAT and to thereby prevent system degradation. The SPACE-ID bits are stored in the STO register. Thus, the space identification discriminating low order bits are n segment table bits where n defines the number of sub-classes of the data spaces. In the examples above, if n bits are used to create different subclasses, then $2^n$ subclasses would result. More specifically, n data-space sub-classes are obtained by generating a unique set of n bits for each combination of n discriminating low-order SPACE-ID bits and n high order virtual page address (PAGE-ADDR) bits. The process of generation of the n high-order effective row select bits for the DLAT 65 is from selector 64 and Exclusive OR 63. The DLAT 65 structure is conventional, the preferred structure being that which is implemented in IBM 3090-S machines. Each DLAT entry has fields for containing nineteen STO bits, one common space bit, one private space bit, eleven high-order virtual address bits, and nineteen high-order real address bits. As explained above, the process of generation of the n high-order effective row select bits for the DLAT 65 is from selector 64 and Exclusive OR 63. The example in FIG. 7 is for four sub-classes (e.g., n equals 2) and that in FIG. 8 is for eight sub-classes (e.g., n equals 3).

Additionally, the nineteen STO bits in each DLAT correspond generally to the nineteen STO bits from STO 62. Specifically, as explained above, each DLAT entry has fields for containing nineteen STO bits, one common space bit, one private space bit, eleven high-order virtual address bits, and nineteen high-order real address bits. The nineteen STO bits in each DLAT correspond generally to the nineteen STO bits from STO 62.

When "p" bit 61 is zero, the selector 64 will select the a-input n high-order PAGE-ADDR bits 60. When the "p" bit 61 is one, the selector 64 will select the b-input n bits generated by Exclusive OR 63 of n discriminating low-order SPACE-ID (STO) bits 62 with n high-order PAGE-ADDR bits 60. The 8-n low-order effective DLAT row select bits for the DLAT 65 are the unhashed 8-n low-order page address bits from the page address field, PX, of the virtual address 60. Note that if the Exclusive OR function is not performed but low-order SPACE-ID bits 63 are substituted unchanged, the result is a partitioning of the DLAT rather than a reallocation of the total DLAT. The term "low-order SPACE-ID bits 63" mentioned above means, for example, n discriminating space identification bits having a low order, as predetermined by the operator/system programmer.

A DLAT hit is determined by the three-way compare function performed by comparator 66. The CMPR1 function is a binary "1" when the SPACE-ID bits 62 and the STO bits read out from the DLAT 65 are equal. The CMPR2 function is a binary "1" when the "p" bit 61 and the corresponding "p" bit read out from the DLAT 65 are equal. The CMPR3 function is a binary "1" when the segment address bits of the virtual address 60 and the virtual address (VA) read out from the DLAT 65 are equal. A DLAT hit is indicated when all three compare functions generate a binary "1" output to an AND gate 66' which in turn produces a binary "1" output to OR gate 68. A DLAT hit can also be made when the common space "c" bit of the selected DLAT entry is a binary "1" and the CMPR3 function is a binary "1". The architecture prevents the case of the "p" bit and the "c" bit both being ones for the same address translation; therefore, any DLAT entry would not have the "p" and "c" bits both binary "1s".

For an implementation where n equals two, the resultant values of this Exclusive OR operation, for all combinations of two SPACE-ID bits and two high-order PAGE-ADDR bits, are shown in the table of FIG. 7. Note that the zero sub-class data space assignment rule is the same as the assignment rule for address spaces.

With the n equal two implementation, the DLAT is logically divided into four sub-classes for the virtual PAGE-ADDRs. Given a 256×2 DLAT with n equal two and if spaces A, B and C are in sub-classes "00", "01" and "10", respectively, then for the periodic processing example of A(i)+B(i)=C(i), there will be no thrashing of a two-way DLAT. Since MVS assigns STD bits to data spaces in a random fashion, the probability of all three data spaces referenced being in the same sub-class is small (i.e. 0.0625) When the STD bits are assigned in sequence, which may occur with MVS, the probability of all three consecutively created data spaces being in the same sub-class is zero.

For an implementation where n equals three, the resultant values of the Exclusive OR operation for all combinations of three SPACE-ID bits and three high-order PAGE-ADDR bits are shown in the table of FIG. 8. Note again that the zero sub-class data space assignment rule is the same as the assignment rule for address spaces. The practical effect with the n equal three implementation is that the DLAT is logically divided into eight sub-classes for the same virtual PAGE-ADDR. Thus, for the periodic processing example of A(i)+B(i)=C(i), there will be almost no thrashing of a two-way DLAT. This minimum thrashing follows from MVS assignment of STD bits to data spaces in a random fashion. The probability of all three spaces referenced being in the same sub-class is very small (i.e., 0.0156).

For an implementation where n equals eight, there is maximum dispersion of assignment across all data space DLAT sub-classes for like PAGE-ADDRs of data spaces. This dispersion minimizes DLAT thrashing due to data space synonyms. On the other hand, there is, effectively, maximum concentration of assignment to the zero data space DLAT sub-class for like PAGE-ADDRs of address spaces. This concentration allows the performance advantage of common-segment bit for address spaces.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A directory look-aside table logic for a virtual storage system which can have pages in different address spaces having the same virtual address, the address spaces being identified by respective segment tables, said directory look-aside table logic comprising:

first means for distinguishing between address spaces and data spaces, an address space of said address spaces being a space representing an address of a page of said pages and a data space of said data spaces being a space associated with data not commonly accessible to all of said address spaces;

second means for sub-classifying data spaces by one or more space identification discriminating low order bits; and third means responsive to said first and second means for providing a unique algorithm for each sub-class of data spaces for the assignment of virtual page addresses to directory look-aside table rows using virtual page-address bits.

2. The directory look-aside table logic recited in claim 1 wherein said first means comprises a bit representing a private space, said bit when set, designating a data space of said data spaces.

3. The directory look-aside table logic recited in claim 2 wherein said space identification discriminating low order bits are n segment table bits where n defines the number of sub-classes of said data spaces.

4. The directory look-aside table logic recited in claim 3 wherein the number of said space identification discriminating low order bits is two.

5. The directory look-aside table logic recited in claim 3 wherein the number of said space identification discriminating low order bits is three.

6. The directory look-aside table logic recited in claim 3 wherein said third means comprises:

Exclusive OR means for combining n-bits of a page address of a virtual address with n-bits of said segment table origin bits to produce a first output; and selector means responsive to said first means for selecting said first output to form a directory look-aside table row select signal when said bit representing a private space is set but, otherwise, selecting said n-bits of said page address to form said directory look-aside table row select signal.

7. The directory look-aside table logic recited in claim 6 further comprising three-way compare means responsive to said first and second means, a segment portion of said virtual address and an output from a directory look-aside table for determining a hit for a real address read out of said directory look-aside table.

8. The directory look-aside table logic recited in claim 7 wherein said three-way compare means comprises:

first compare means for comparing said segment table origin bits with corresponding segment table origin bits read out of said directory look-aside table;

second compare means for comparing said bit representing a private space with a corresponding private-space bit read out of said directory look-aside table; and third compare means for comparing said segment portion of said virtual address with a corresponding portion of a virtual address read out of said directory look-aside table, a comparison by all three of said first, second and third compare means indicating a hit.

9. The directory look-aside table logic recited in claim 8 further comprising means for distinguishing between common address space and private address space, a common-space bit when set designating common address space, a setting of said common-space bit and said bit representing a private space being mutually exclusive, a hit also being determined by a comparison by said third compare means and said common-space bit being set.

* * * * *